US011579896B2

(12) United States Patent
Kurup et al.

(10) Patent No.: US 11,579,896 B2
(45) Date of Patent: Feb. 14, 2023

(54) AUTONOMOUSLY RE-INITIALIZING APPLICATIONS BASED ON DETECTING PERIODIC CHANGES IN DEVICE STATE

(71) Applicant: Bank of America Corporation, Charlotte, NC (US)

(72) Inventors: Krishna Kumar Purushothama Kurup, Princeton, NJ (US); Susanta Kumar Nayak, Monroe, NJ (US); Shyam Kottayil Panaghat, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 739 days.

(21) Appl. No.: 16/578,909

(22) Filed: Sep. 23, 2019

(65) Prior Publication Data

US 2021/0089330 A1 Mar. 25, 2021

(51) Int. Cl.
*G06F 9/44* (2018.01)
*G06F 9/445* (2018.01)
*G06F 9/4401* (2018.01)
*G06F 8/41* (2018.01)

(52) U.S. Cl.
CPC ........ *G06F 9/44505* (2013.01); *G06F 9/4401* (2013.01); *G06F 8/41* (2013.01)

(58) Field of Classification Search
CPC ....... G06F 9/44505; G06F 9/4401; G06F 8/41
See application file for complete search history.

(56) References Cited

U.S. PATENT DOCUMENTS

| 6,964,368 | B1 * | 11/2005 | Trelawney | ............. | G07F 19/20 |
| | | | | | 235/375 |
| 2004/0260956 | A1 * | 12/2004 | Pagan | ................... | G06F 9/4406 |
| | | | | | 713/300 |

(Continued)

OTHER PUBLICATIONS

"Now Available: The IIS 7.5 Application Warm-Up Module", Oct. 14, 2009, downloaded from <https://blogs.iis.net/thomad/now-available-the-iis-7-5-application-warm-up-module> on Sep. 23, 2019.

(Continued)

*Primary Examiner* — Danny Chan
(74) *Attorney, Agent, or Firm* — Banner & Witcoff, Ltd.

(57) ABSTRACT

Arrangements for autonomously re-initializing one or more applications after a detected change in device state are provided. In some examples, a configuration file may be received from one or more computing devices, such as a server, hosting one or more client-facing applications. In some examples, the configuration file may be modified. For instance, one or more properties or attributes may be modified or added to identify applications that have an always running status and identifying a custom class having automatic start enabled. A modified configuration file may be generated and transmitted to the one or more devices. Accordingly, upon detecting a change of device state (e.g., reboot, refresh, or the like) the modified configuration file may reboot and cause the identified applications to automatically or autonomously re-load, re-initialize and recompile prior to receiving a first request for access from a customer or user device.

21 Claims, 11 Drawing Sheets

(56) References Cited

U.S. PATENT DOCUMENTS

| | | | | |
|---|---|---|---|---|
| 2006/0179432 A1* | 8/2006 | Walinga | ................. | H04L 43/12 |
| | | | | 717/176 |
| 2009/0182732 A1* | 7/2009 | Dian | ................. | G06F 16/3329 |
| | | | | 707/999.005 |
| 2015/0355955 A1* | 12/2015 | Chakra | ................. | G06F 9/542 |
| | | | | 719/318 |
| 2021/0076444 A1* | 3/2021 | Shu | ...................... | H04W 76/25 |
| 2021/0235517 A1* | 7/2021 | Won | ...................... | H04W 80/10 |

OTHER PUBLICATIONS

"Warming up an IIS Application Pool automatically?", Mar. 26, 2012, downloaded from <https://serverfault.com/questions/373548/warming-up-an-iis-application-pool-automatically> on Sep. 23, 2019.

\* cited by examiner

US 11,579,896 B2

AUTONOMOUSLY RE-INITIALIZING APPLICATIONS BASED ON DETECTING PERIODIC CHANGES IN DEVICE STATE

BACKGROUND

Aspects of the disclosure relate to electrical computers, systems, and devices for autonomously initializing applications on one or more devices. In particular, one or more aspects of the disclosure relate to autonomously re-initializing applications based on detecting changes in a device state.

Large enterprise organizations provide numerous applications that serve clients and other users. Because of the large volume of data cashed by the devices (e.g., server devices, and the like) supporting these applications, the devices are often refreshed or rebooted on a periodic basis to avoid services being in a hung state or other fault due to loss of resources. In some examples, that reboot may occur on a predetermined schedule (e.g., each night at midnight, or the like). Further, issues can arise at any time that may cause a fault in a device, cause a reboot or refresh to occur, or the like. However, because applications hosted by the devices do not re-initialize after a reboot (either scheduled or unscheduled), a first request to access an application may take longer than is provided in a service level agreement (SLA). Accordingly, it would be advantageous to automatically re-initialize applications on detection of a change in device state (e.g., reboot, or the like).

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with delays in service and access time due to reboot of devices.

In some examples, a configuration file defining various aspects of applications, devices, and the like, may be received. The configuration file may be received from one or more computing devices, such as a server, hosting one or more client-facing applications. In some examples, the configuration file may be modified. For instance, one or more properties or attributes may be modified or added to identify applications that have an always running status and identifying a custom class having automatic start enabled. A modified configuration file may be generated and transmitted to the one or more devices. Accordingly, upon detecting a change of device state (e.g., reboot, refresh, or the like) the modified configuration file may reboot and cause the identified applications to automatically or autonomously re-load, re-initialize and recompile prior to receiving a first request for access from a customer or user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to autonomous re-initializing of computing devices based on a detected change in device state. As discussed herein, periodic or spontaneous reboot of computing devices, such as server devices, hosting one or more client-facing applications may cause delays in servicing a first user request after the reboot. For instance, the server may not re-load, re-initialize or recompiled the application until the request for service is received from the user or client. Accordingly, the initial or first request for access to the application received after a reboot is delayed because of the time necessary to re-load, re-initialize and recompile the application. Accordingly, aspects described herein are directed to arrangements for automatically or autonomously re-loading, re-initializing and recompiling one or more client-facing applications after a change in device state, such as a reboot, and prior to receiving a first request for access from a client or user device.

These and various other arrangements will be discussed more fully below.

Figure 1A:
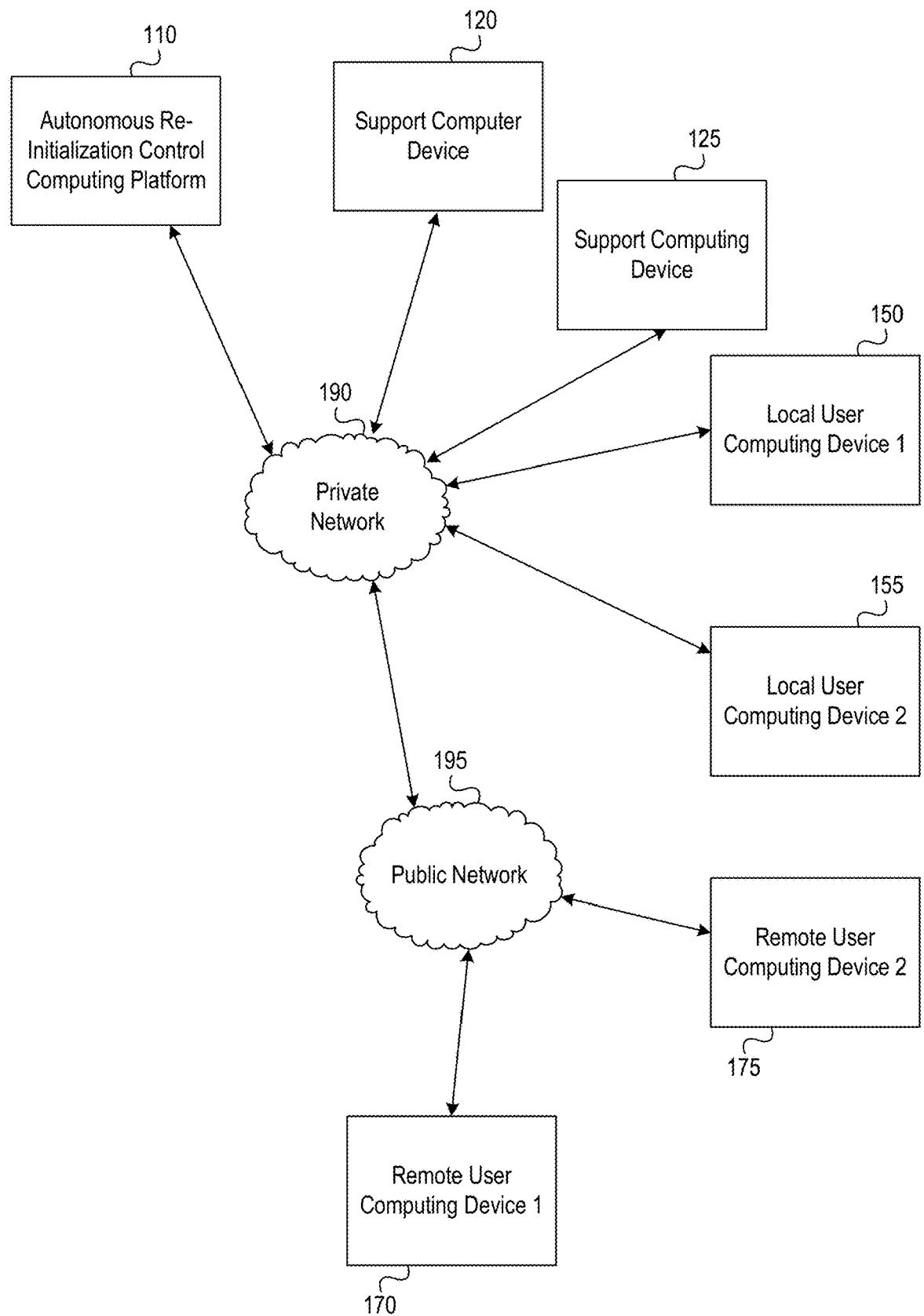
FIGS. 1A and 1B depict an illustrative computing environment for implementing autonomous re-initializing functions in accordance with one or more aspects described herein.
Figure 1B:
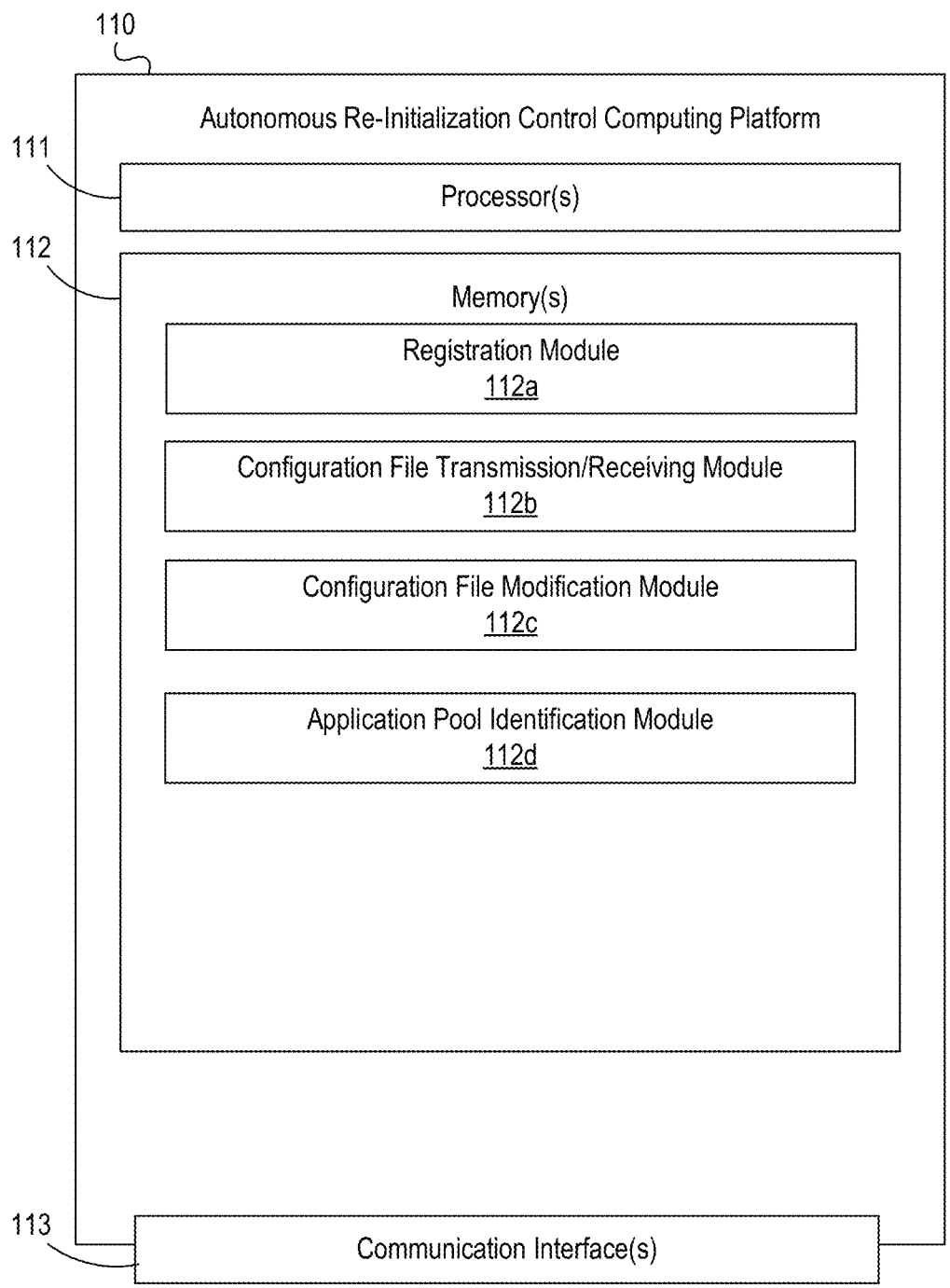

FIGS. 1A-1B depict an illustrative computing environment for implementing and using a system for autonomously re-initializing computing devices based on a detected change in device state in accordance with one or more aspects described herein. Referring to FIG. 1A, computing environment 100 may include one or more computing devices and/or other computing systems. For example, computing environment 100 may include autonomous re-initialization control computing platform 110, a support computing device 120, a support computing device 125, a first local user computing device 150, a second local user computing device 155, a first remote user computing device 170, and a second remote user computing device 175. Although two support computing devices 120, 125 are shown in FIG. 1A, more or fewer computing devices may be used without departing from the invention. Further, although the autonomous re-initialization control computing platform 110, support computing device 120, and support computing device system 125 as described as separate devices, the autonomous re-initialization control computing platform 110 may be integrated into (e.g., within a same physical device, in communication with or connected to, or the like) support computing device 120 and/or support computing device 125, without departing from the invention.

Autonomous re-initialization control computing platform 110 may be configured to provide intelligent, dynamic, autonomous, re-loading, re-initialization, recompiling and the like of applications hosted by one or more computing devices, such as support computing device 120, support computing device 125, and the like. For instance, autonomous re-initialization control computing platform 110 may receive a configuration file and may be configured to modifying one or more aspects, attributes, properties, or the like, of the configuration file that may cause one or more processes to execute on one or more computing devices, such as support computing device 120, support computing device 125, or the like. The configuration file may contain information about the applications hosted by the computing devices, application pools, and the like, and may be modified to identify one or more applications or application pools that should be always running, applications that should automatically re-initialize upon detection of a device state change, or the like. After modifying the configuration file, the configuration file may be transmitted to each computing device, such as support computing device 120, support computing device 125, or the like, and executed upon detection of a device state change. Execution of the modified configuration file may cause one or more identified applications or application pools to autonomous re-initialize, re-load, recompile, and the like, to be ready to provide service upon receiving a first request for access or service after the device state change.

Support computing device 120, support computing device 125, and the like, may be a server computer, or any other computing device suitable for hosting or supporting execution of one or more applications or application pools providing services to customers (e.g., mobile device applications, online applications, and the like).

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the autonomous re-initialization control computing platform 110 to control parameters of the system, update or execute rules, modify settings, and the like. In some arrangements, one or more of local user computing device 150, local user computing device 155, remote user computing device 170, and/or remote user computing device 175 may be used to receive notifications, display one or more interactive user interfaces, receive user input requesting modifications, and the like.

The remote user computing device 170 and remote user computing device 175 may be used to communicate with, for example, one or more servers, such as support computing device 120, support computing device 125, or the like. For instance, remote user computing device 170, remote user computing device 175, or the like, may be computing devices associated with one or more users that may be used to request access to one or more applications executing on or hosted by the support computing device 120, support computing device 125, or the like. Remote user computing devices 170, 175 may include user computing devices, such as mobile devices including smartphones, tablets, laptop computers, and the like, and/or desktop or other computing devices, that may communicate with support computing device 120, support computing device 125, or the like, via wired or wireless connections to access one or more applications hosted by support computing device 120, support computing device 125, or the like.

Computing environment 100 also may include one or more computing platforms. For example, and as noted above, computing environment 100 may include autonomous re-initialization control computing platform 110. As illustrated in greater detail below, autonomous re-initialization control computing platform 110 may include one or more computing devices configured to perform one or more of the functions described herein. For example, autonomous re-initialization control computing platform 110 may include one or more computers (e.g., laptop computers, desktop computers, servers, server blades, or the like).

As mentioned above, computing environment 100 also may include one or more networks, which may interconnect one or more of autonomous re-initialization control computing platform 110, support computing device 120, support computing device 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, autonomous re-initialization control computing platform 110, support computing device 120, support computing device 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect autonomous re-initialization control computing platform 110, support computing device 120, support computing device 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., autonomous re-initialization control computing platform 110, support computing device 120, support computing device 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., autonomous re-initialization control computing platform 110, support computing device 120, support computing device 125, local user computing device 150, local user computing device 155).

Referring to FIG. 1B, autonomous re-initialization control computing platform 110 may include one or more processors 111, memory 112, and communication interface 113. A data bus may interconnect processor(s) 111, memory 112, and communication interface 113. Communication interface 113 may be a network interface configured to support communication between autonomous re-initialization control computing platform 110 and one or more networks (e.g., private network 190, public network 195, or the like). Memory 112 may include one or more program modules having instructions that when executed by processor(s) 111 cause autonomous re-initialization control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of autonomous re-initialization control computing platform 110 and/or by different computing devices that may form and/or otherwise make up autonomous re-initialization control computing platform 110.

For example, memory 112 may have, store and/or include a registration module 112a. Registration module may store instructions and/or data that may cause or enable the autonomous re-initialization control computing platform 110 to receive data from one or more computing devices, such as support computing device 120, support computing device 125, and the like. The registration data may include machine identifiers, software identifiers, and the like.

Memory 112 may further have, store and/or include configuration file transmission/receiving module 112b. Configuration file transmission/receiving module 112b may store instructions and/or data that may cause or enable the autonomous re-initialization control computing platform 110 to generate a request for a configuration file, transmit the request, receive the configuration file from one or more computing devices, and transmit a modified configuration file to the one or more computing devices.

In some examples, configuration file transmission/receiving module 112b may also monitor a configuration file for changes to the file. For instance, one or more new applications, methods, application pools, and the like, may be identified and added to a configuration file for autonomous re-initializing. In some arrangements, configuration file transmission/receiving module 112b may scan one or more configuration files on one or more devices, such as support computing device 120, support computing device 125, similar to a file watcher function, to identify changes in a configuration file that may include additional applications for autonomous re-initializing. Upon detection of a change in identified applications the configuration file, the updates may be distributed to other server devices and any newly identified applications or application pools will also be re-initialized, re-loaded and recompiled without requiring redeployment of the applications.

Autonomous re-initialization control computing platform 110 may further have, store and/or include configuration file modification module 112c. Configuration file modification module 112c may store instructions and/or data that may cause or enable the autonomous re-initialization control computing platform 110 to generate or enter one or more modifications to a received configuration file. For instance, one or more attributes or properties of the configuration file may be modified, added, removed, or the like.

Autonomous re-initialization control computing platform 110 may further have, store and/or include application pool identification module 112d. Application pool identification module 112d may store instructions and/or data that may cause or enable the autonomous re-initialization control computing platform 110 to identify one or more application pools including one or more application(s) within each application pool. As discussed herein, application pools may be used to isolate one or more applications from other applications hosted by a same device to improve security, reliability, and reserve computing resources.

FIGS. 2A-2F depict one example illustrative event sequence for implementing and using autonomous re-initialization processes in accordance with one or more aspects described herein. The events shown in the illustrative event sequence are merely one example sequence and additional events may be added, or events may be omitted, without departing from the invention.

Figure 2A:
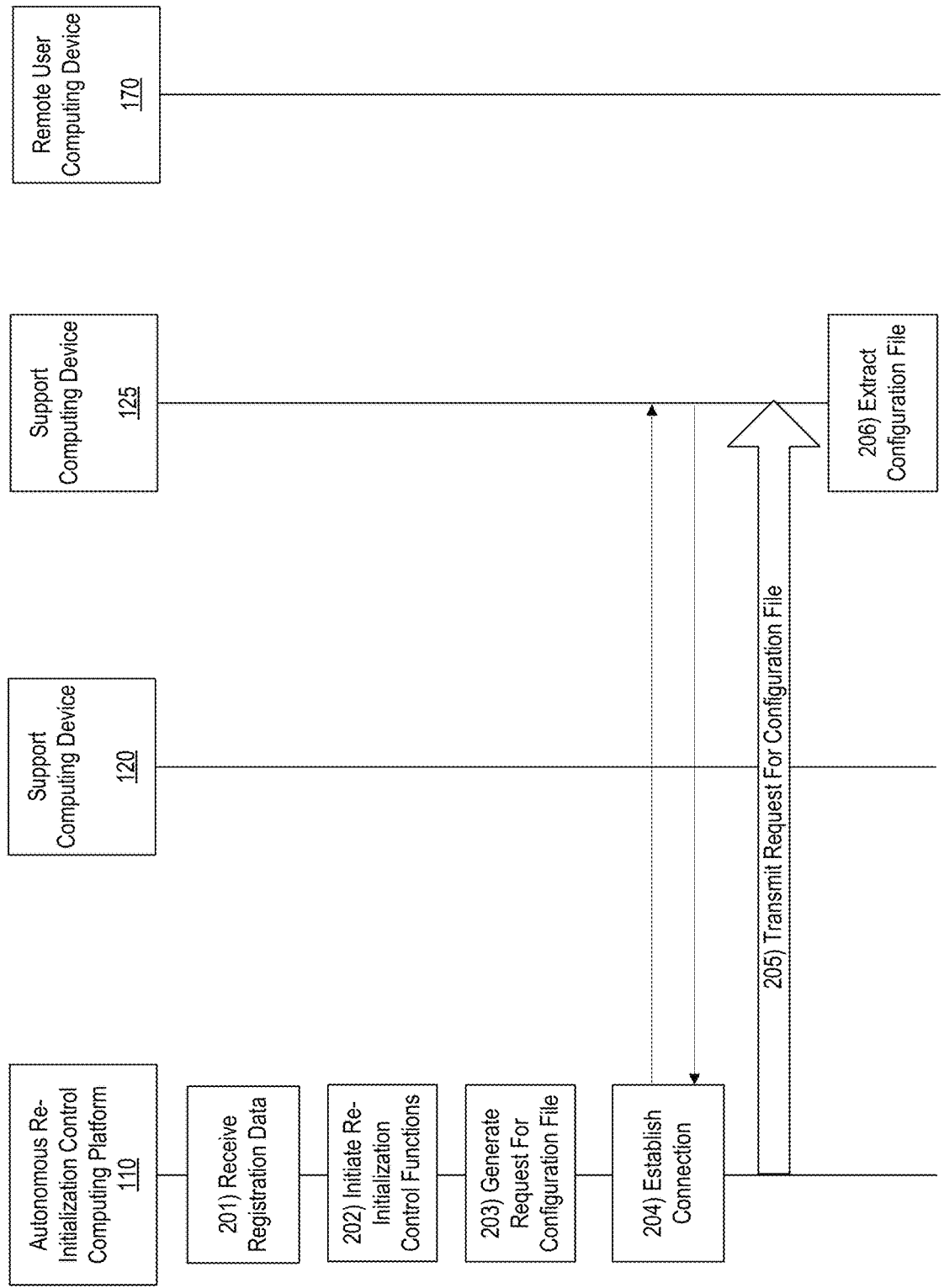
FIGS. 2A-2F depict an illustrative event sequence for implementing autonomous re-initializing functions in accordance with one or more aspects described herein.

Referring to FIG. 2A, at step 201, registration data may be received. For instance, one or more servers or other computing devices, such as support computing device 120, support computing device 125, or the like, may be registered with the system. In some examples, the one or more servers may host one or more applications that may be provide client services. For instance, the one or more servers may host applications providing websites and other client-facing applications that may be accessed via one or more user devices, such as remote user computing device 170, remote user computing device 175, or the like. The one or more user devices may be mobile devices of the user (e.g., smartphone, tablet computer, laptop computer, or the like), and/or may include desktop computers or other computing devices.

At step 202, based on the received registration data, one or more re-initialization control functions of the autonomous re-initialization control computing platform 110 may be enabled, activated and/or initiated. For instance, one or more functions that was previously disabled or deactivated may be enabled or activated based on the received registration data.

At step 203, a request to receive a configuration file from one or more servers, such as support computing device 120, support computing device 125, or the like, may be generated. The request may include identification of the configuration file to be extracted and a destination to which to transmit the configuration file. In some examples, each server may execute a same configuration file. Accordingly, a request for the configuration file may be transmitted to one server device. In other examples, different server devices may execute different configuration files. Accordingly, in some arrangements, the request for the configuration file may be transmitted to each server device (e.g., support computing device 120, support computing device 125, and the like).

At step 204, a connection may be established between the autonomous re-initialization control computing platform 110 and support computing device 125. For instance, a first wireless connection may be established between the autonomous re-initialization control computing platform 110 and support computing device 125. Upon establishing the first wireless connection, a communication session may be initiated between autonomous re-initialization control computing platform 110 and support computing device 125.

At step 205, the generated request for the configuration file may be transmitted to support computing device 125. For instance, the request for the configuration file may be transmitted during the communication session initiated upon establishing the first wireless connection.

At step 206, the request for the configuration file may be received by support computing device 125 and the configuration file may be extracted.

Figure 2B:
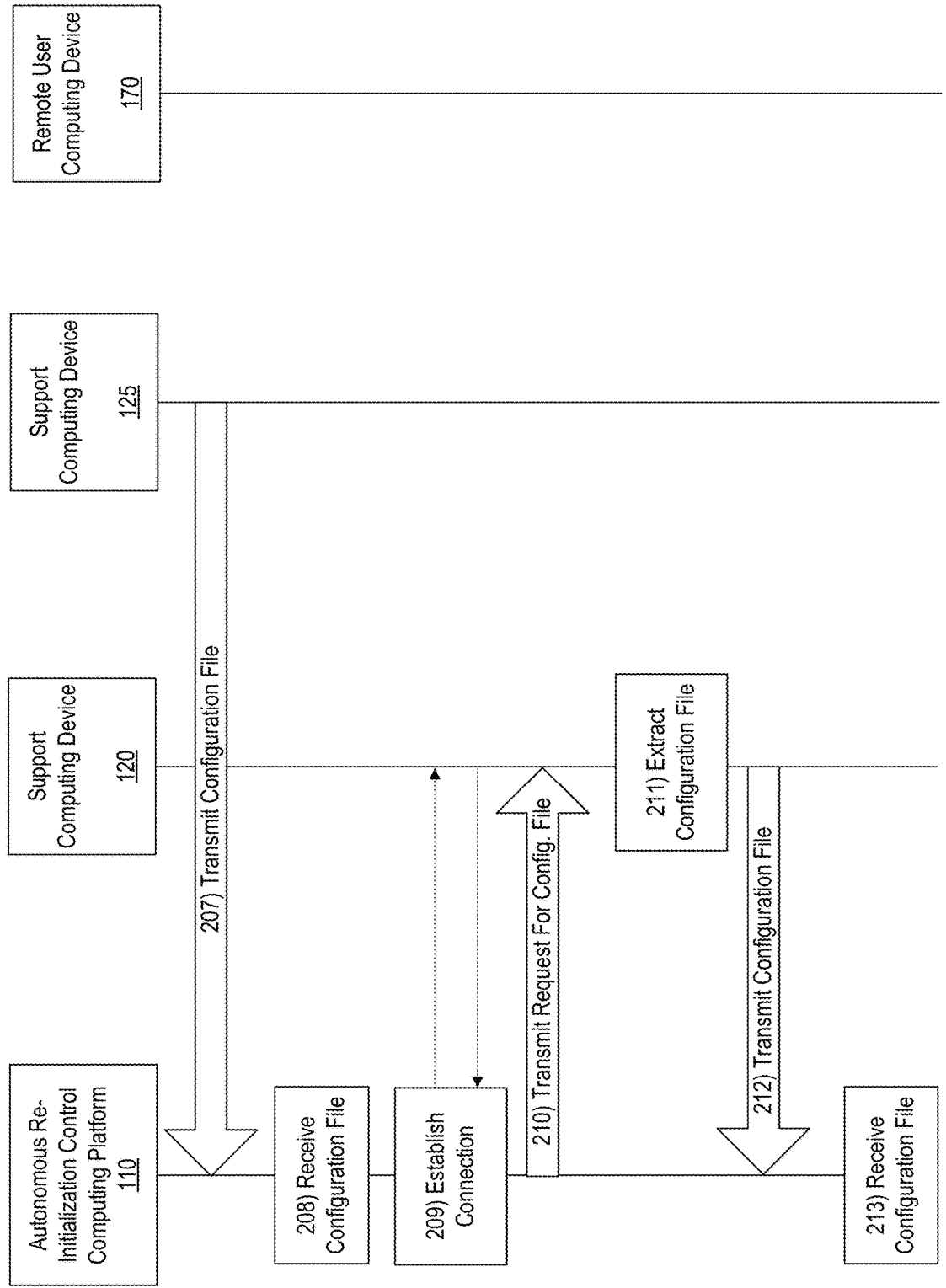

With reference to FIG. 2B, at step 207, the requested configuration file may be transmitted from the support computing device 125 to the autonomous re-initialization control computing platform 110. At step 208, the configuration file may be received by the autonomous re-initialization control computing platform 110.

In examples in which multiple configuration files are being requested, at step 209, a connection may be established between the autonomous re-initialization control computing platform 110 and support computing device 120. For instance, a second wireless connection may be established between the autonomous re-initialization control computing platform 110 and support computing device 120. Upon establishing the second wireless connection, a communication session may be initiated between autonomous re-initialization control computing platform 110 and support computing device 120.

At step 210, the generated request for the configuration file may be transmitted to support computing device 120. For instance, the request for the configuration file may be transmitted during the communication session initiated upon establishing the second wireless connection.

At step 211, the request for the configuration file may be received by support computing device 120 and the configuration file may be extracted. At step 212, the requested configuration file may be transmitted from the support computing device 120 to the autonomous re-initialization control computing platform 110. At step 213, the configuration file may be received by the autonomous re-initialization control computing platform 110.

Figure 2C:
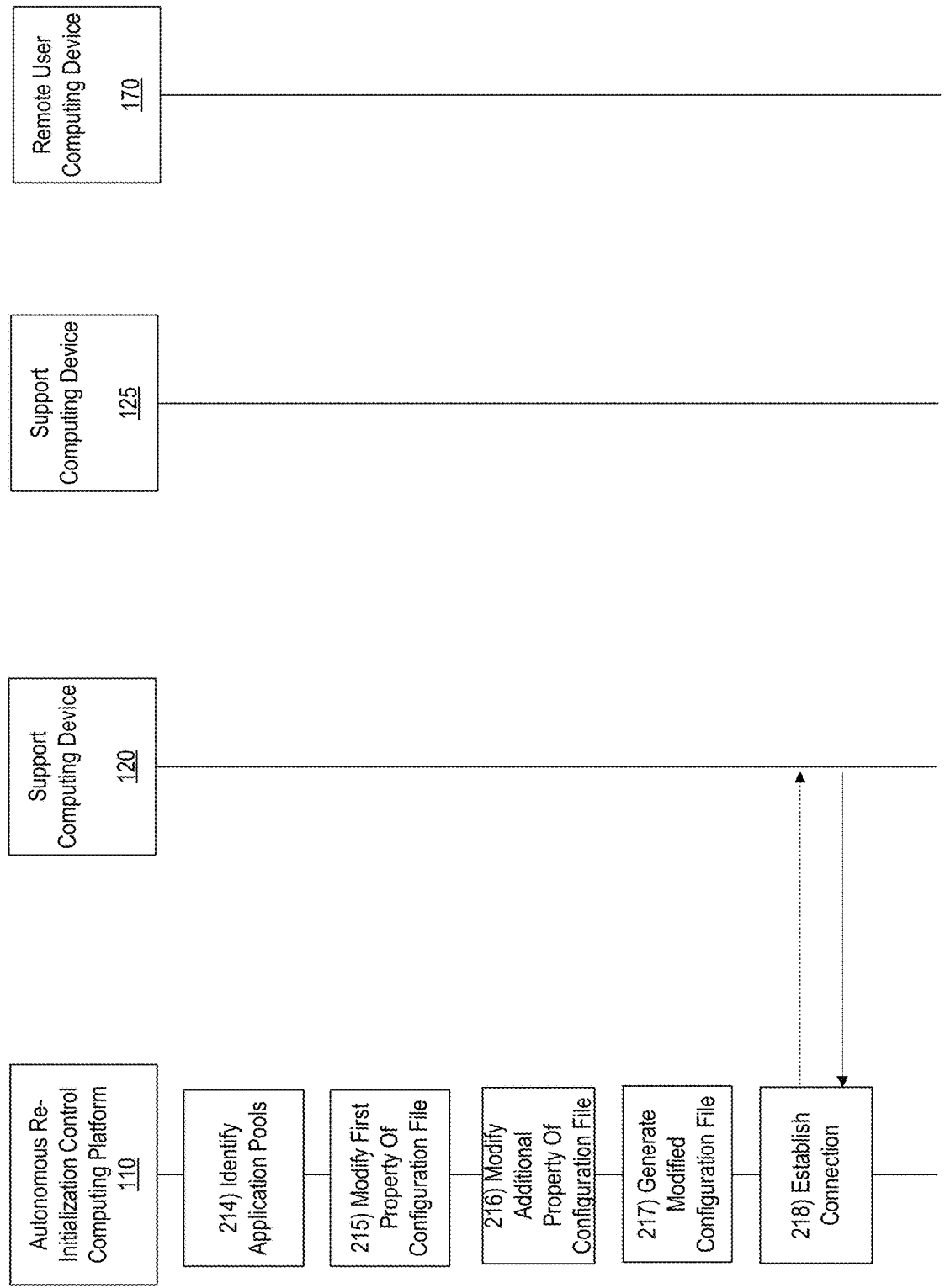

With reference to FIG. 2C, at step 214, one or more application pools may be identified. For instance, in an effort to improve security and conserve computing resources, one or more application pools may be identified or generated. The application pools may include a plurality of applications that are isolated from other applications or application pools running on a same server through process boundaries. Accordingly, the group of universal resource locators (URLs) associated with applications in an application pool may be served by a particular worker process or set of worker processes. Use of application pools may improve security by isolating applications, improve reliability by maintaining applications outside of an application pools that has an issue, and the like.

At step 215, a property of the one or more received configuration files may be modified or added. For instance, a start mode property of the one or more received configuration files may be modified or added to the configuration file to include an "always running" value. Accordingly, this value, when executed by the configuration file, may force all applications within the identified application pool to always run. This may aid in autonomous re-initializing, reloading, recompiling of applications after a device state change.

At step 216, one or more additional properties or attributes of the configuration file may be modified or added. For instance, a property or attribute to automatically start one or more applications upon reloading of a worker process may be added or modified. In some examples, the property or attribute may include a "true" value associated with an attribute or property of "serviceautostartenabled." This automatic start value may be executed for all applications in an identified customer class. For instance, a custom class may be defined within the configuration file as an additional modification to the configuration file. The custom class may define actions (e.g., scripts, payloads, and the like) triggered or executed upon a worker process reload (e.g., upon a detection of a device state change). These actions, when executed, may cause the one or more applications in an identified application pool to recompile, load all information in cache and be ready to service a next request (e.g., first request from a user to access the system or application after device state change) in an expected time period, rather than with the delays associated with conventional systems.

At step 217, the modified configuration file may be generated based on the modified and/or added properties and/or attributes. At step 218, a connection may be established between the autonomous re-initialization control computing platform 110 and support computing device 120. For instance, a third wireless connection may be established between the autonomous re-initialization control computing platform 110 and support computing device 120. Upon establishing the third wireless connection, a communication session may be initiated between autonomous re-initialization control computing platform 110 and support computing device 120.

Figure 2D:
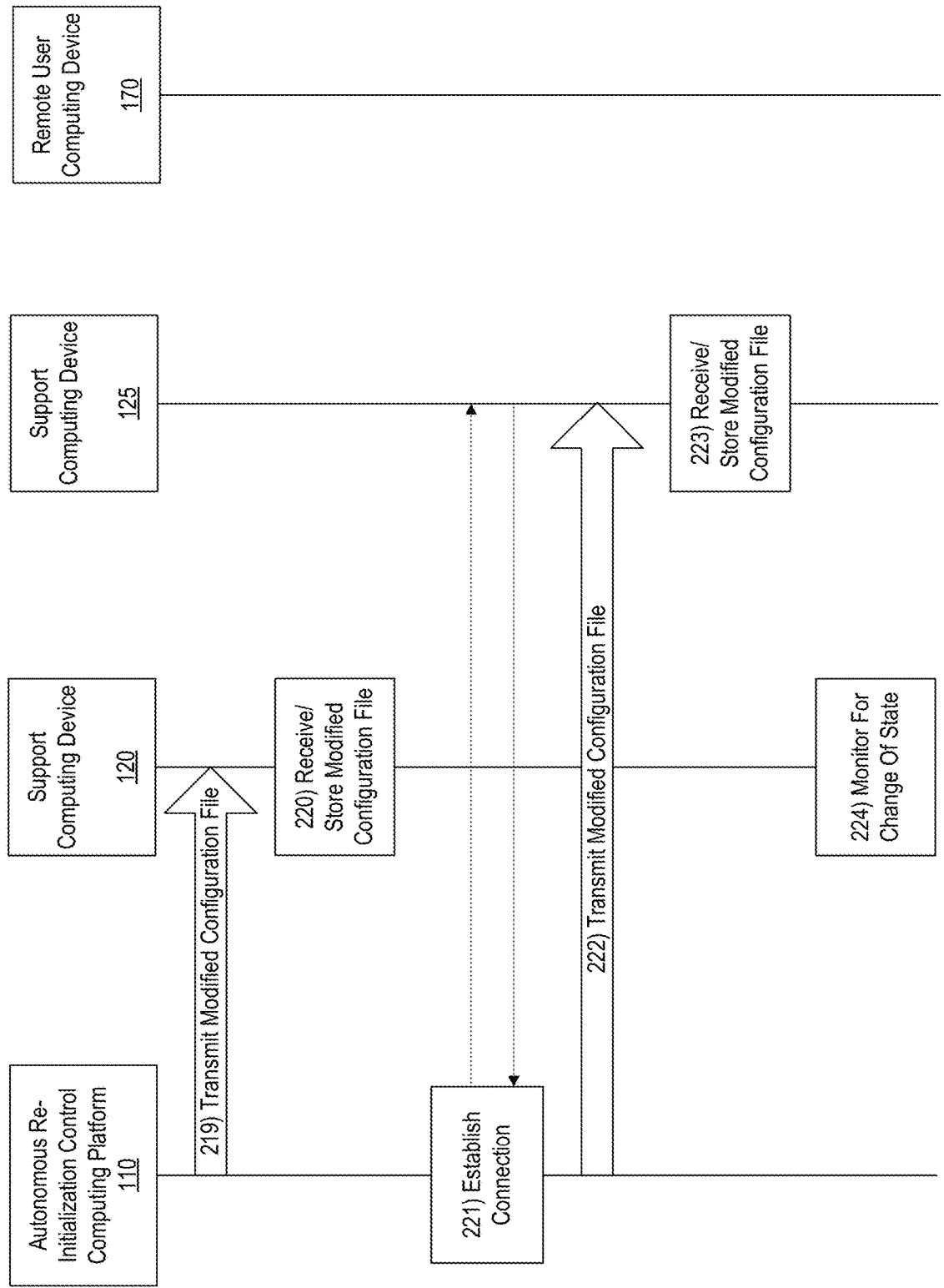

With reference to FIG. 2D, at step 219, the modified configuration file may be transmitted from the autonomous re-initialization control computing platform 110 to support computing device 120. For instance, the modified configuration file may be transmitted during the communication session initiated upon establishing the third wireless connection.

At step 220, the modified configuration file may be received by support computing device 120 and stored.

As step 221, a connection may be established between the autonomous re-initialization control computing platform 110 and support computing device 125. For instance, a fourth wireless connection may be established between the autonomous re-initialization control computing platform 110 and support computing device 125. Upon establishing the fourth wireless connection, a communication session may be initiated between autonomous re-initialization control computing platform 110 and support computing device 125.

At step 222, the modified configuration file may be transmitted from the autonomous re-initialization control computing platform 110 to support computing device 125. For instance, the modified configuration file may be transmitted during the communication session initiated upon establishing the fourth wireless connection.

At step 223, the modified configuration file may be received by support computing device 125 and stored.

At step 224, support computing device 120 may monitor for a change in device state. For instance, a periodic refresh or reboot, a power outage, a system failure, or the like, may cause a change in device state of the support computing device 120.

Figure 2E:
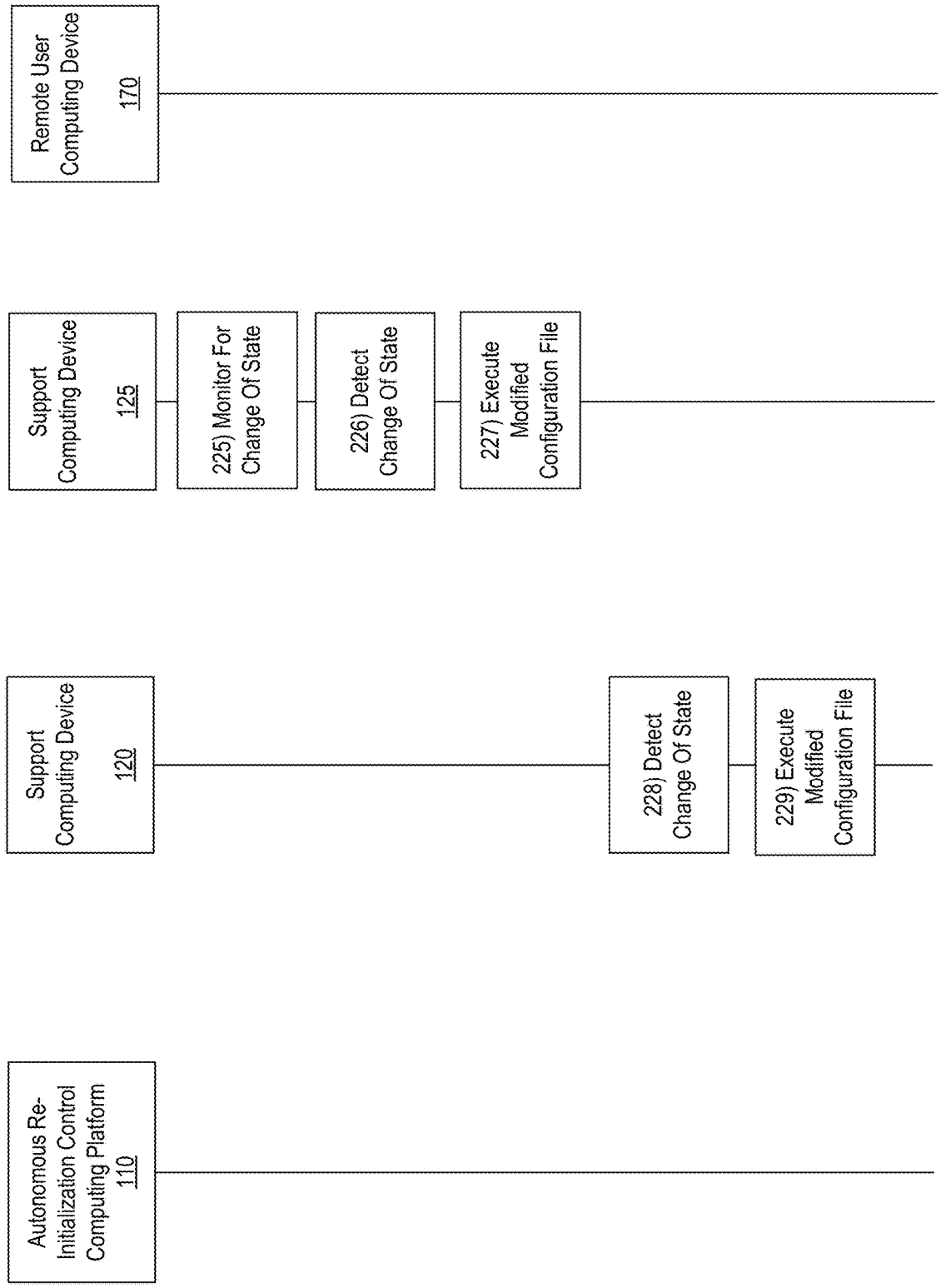

With reference to FIG. 2E, at step 225, support computing device 125 may monitor for a change in device state. For instance, a periodic refresh or reboot, a power outage, a system failure, or the like, may cause a change in device state of the support computing device 125.

At step 226, a chance of state in support computing device 125 may be detected. In response to the detected change of state (e.g., upon return of power up or reboot), the modified configuration file may be executed at step 227. Executing the modified configuration file may cause all applications in the identified application pool(s) to automatically and autonomously reload, re-initialize, and recompile such that the applications in the application pool(s) may be loaded and ready to receive a client request.

At step 228, a chance of state in support computing device 120 may be detected. In response to the detected change of state (e.g., upon return of power up or reboot), the modified configuration file may be executed at step 229. Executing the modified configuration file may cause all applications in the identified application pool(s) to automatically and autonomously reload, re-initialize, and recompile such that the applications in the application pool(s) may be loaded and ready to receive a client request.

Figure 2F:
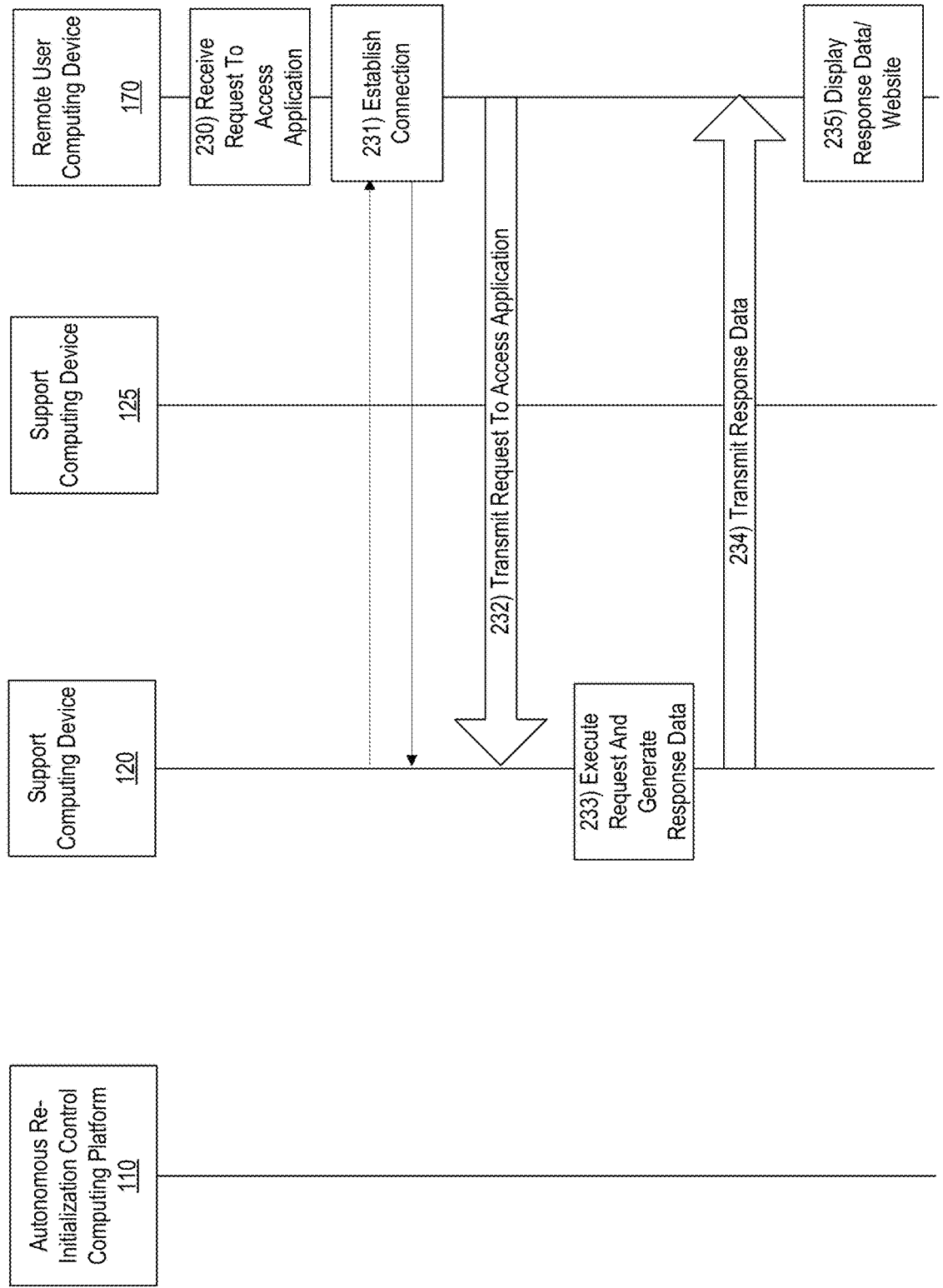

With reference to FIG. 2F, at step 230, a request to access an application may be received by a user computing device, such as remote user computing device 170. For instance, the remote user computing device 170 may receive user input requesting access to an application hosted by one of the server devices (e.g., support computing device 120, support computing device 125, or the like).

At step 231, a connection may be established between the remote user computing device 170 and a support computing device hosting the requested application, such as support computing device 120. For instance, a fifth wireless connection may be established between the remote user computing device 170 and support computing device 120. Upon establishing the fifth wireless connection, a communication session may be initiated between remote user computing device 170 and support computing device 120.

At step 232, the request to access the application may be transmitted from the remote user computing device 170 to the support computing device 120. The request may be transmitted during the communication session initiated upon establishing the fifth wireless connection.

At step 233, the request to access the application may be received by support computing device 120 and executed. In some examples, the request to access the application may be the first request received after the device change of state (e.g., reboot, refresh, or the like). Executing the request may include generate response data, such as identifying and/or generating one or more user interfaces associated with the requested application, retrieving data associated with the requested application and/or requesting user, and the like.

At step 234, the generated response data may be transmitted from the support computing device 120 to the remote user computing device 170. At step 235, the generated response data may be displayed by a display of the remote user computing device 170.

Accordingly, by autonomously re-initializing, reloading, and the like, the applications hosted by the server devices, the request received in, for example, step 232, may be processed in a time period expected or required under one or more service level agreements, rather than being delayed, as the first request after device state change, due to loading, recompiling, and the like, the application upon receiving the first request.

Figure 3:
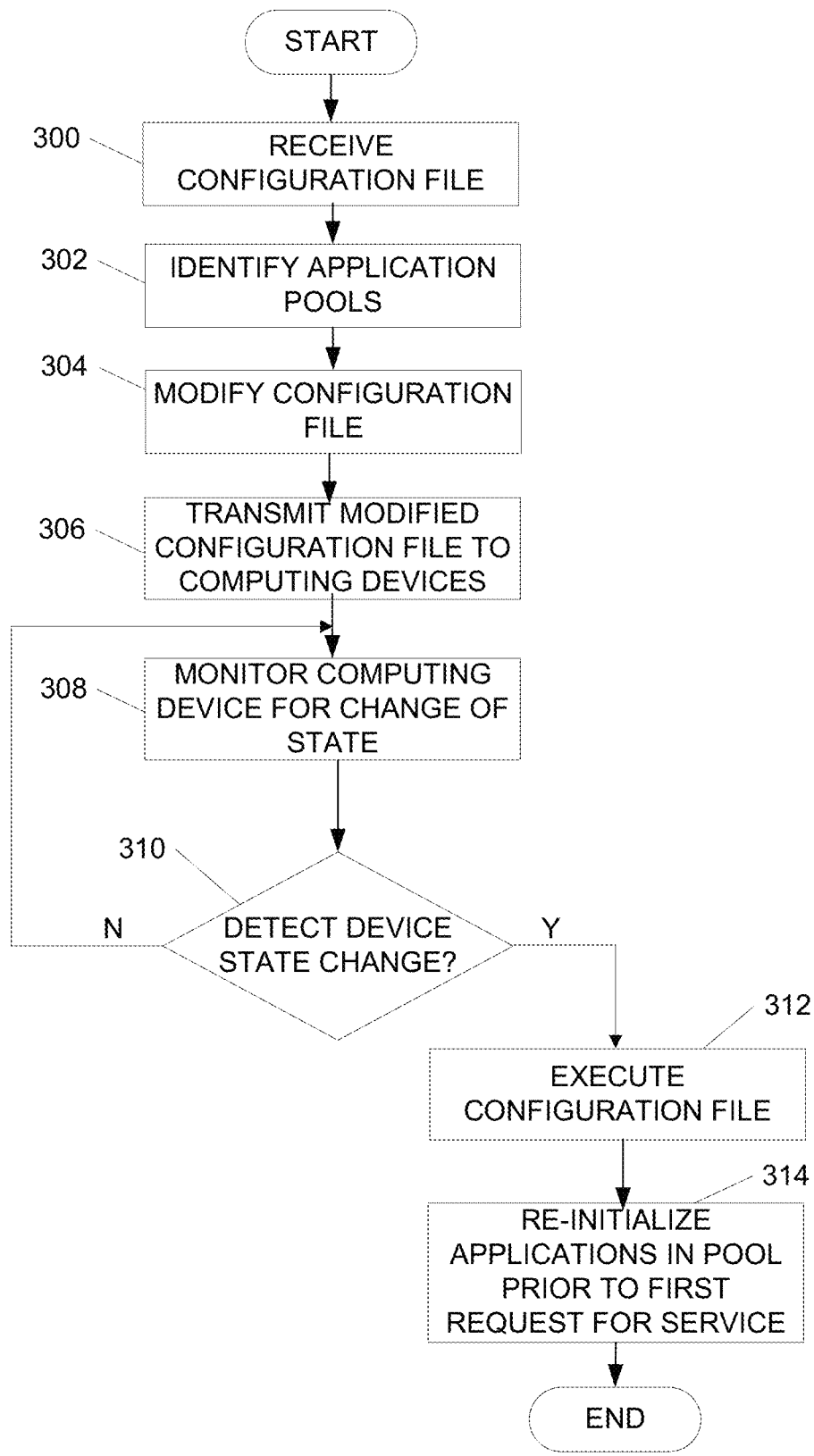
FIG. 3 depicts an illustrative method for implementing and using autonomous re-initializing functions according to one or more aspects described herein.

FIG. 3 is a flow chart illustrating one example method of implementing autonomous re-initializing of applications based on a detected change in device state according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, a configuration file may be received. The configuration file may be used to configure properties, attributes and/or other settings for the device (e.g., server devices such as support computing device 120, support computing device 125, and the like) supporting the applications, such as client-facing applications accessed via, for example, a network connection, such as via the internet. The configuration file may be read by the device at startup and one or more commands within the configuration file may be executed to configure the device for operation. In some examples, a configuration file may be received from each device (e.g., each of support computing device 120, support computing device 125, or the like). Additionally or alternatively, a same configuration file may be used for each device and, accordingly, one configuration file may be received for modification.

At step 302, one or more application pools may be identified. As discussed herein, application pools may be used to group one or more applications, such as client-facing applications, and isolate them from one or more other applications or application pools hosted by a same device (e.g., support computing device 120, support computing device 125, or the like). Accordingly, one or more modifications made to a configuration file may be applied to all applications in an application pool by identifying the applications by application pool.

At step 304, one or more properties of the received configuration file may be modified. For instance, one or more attributes, properties, or the like, may be added or modified to enable autonomous re-initializing, re-loading, recompiling of one or more applications in accordance with aspects described herein. As discussed herein, one or more attributes directed to identifying one or more applications or application pools as always running may be added or modified. Further, an attribute associated with enabling automatic start for one or more custom classes encapsulating pre-load logic that may define actions taken (e.g., scripts, payloads, and the like) when a worker process reloads upon detection of a change in device state (e.g., after reboot, refresh, or the like) may be modified or added to the configuration file. In some examples, enabling automatic start for the custom class may cause a dummy payload to load, thereby causing the application to re-load, re-initialize and recompile, in order to be ready to service a first request from a user or client device within the expected or required time period. Various other property or attribute modifications may be made without departing from the invention.

At step 306, a modified configuration file may be generated based on the modifications made at step 304 and the modified configuration file may be transmitted to the devices supporting the applications (e.g., support computing device 120, support computing device 125). In arrangements in which a same configuration file is used for all devices, the file may be modified and transmitted to each device. In examples in which one or more devices may have different configuration files, each configuration file may be modified as discussed herein and may be transmitted back to a respective device.

At step 308, one or more systems or devices may monitor the support devices (e.g., support computing device 120, support computing device 125, or the like) to identify a change in device state. For instance, a power off event, a reboot or refresh, or the like, may cause a change in operating state of the device. In some examples, the change of state of the device may be a pre-scheduled reboot that may occur on a regular (e.g., periodic) basis, such as every 24 hours, at midnight each night, at 4:00 a.m. each night, every week, or the like. In some examples, the pre-scheduled reboot may occur each day to maintain optimum performance of the device being rebooted.

In some arrangements, the change in device state may be detected because a server or application is in a hung state, an application or application pool may require a reset, and/or a server may need to be recycled. In some examples, a system may automatically reboot, thereby causing execution of the modified configuration file and automatic or autonomous re-loading, re-initializing and recompiling of the applications in the application pool(s) (e.g., without user interaction and prior to a request to access the application from a user device). In some examples, the reboot of the device may be performed manually (e.g., a user may force a reboot). In those examples, the modified configuration file will execute and the applications will automatically or autonomously re-load, re-initialize and recompile (e.g., without user interaction and prior to a request for access from a user device).

At step 310, a determination may be made as to whether a change in device state is detected based on the monitoring. If not, the process may return to step 308 and continue monitoring the one or more devices.

If a device state change is detected at step 310, at step 312, upon restart of the device after the change of state, the modified configuration file transmitted to the respective device may be executed. Executing the modified configuration file may cause one or more applications, such as client-facing applications, in an identified application pool (e.g., within the modified configuration file) to re-load, re-initialize and recompile automatically and autonomously upon execution of the configuration file (e.g., before receiving a request for access to or service from the application). Accordingly, rather than waiting for a request to access an application before re-loading, re-initializing and recompiling, which may cause delays, execution of the modified configuration file may cause the one or more applications to autonomously re-load, re-initialize and recompile to be ready for a client request for access without delays and within an expected time period.

As discussed herein, aspects described are directed to improving server response time by automatically or autonomous re-loading, re-initializing and recompiling one or more client-facing applications hosted by a respective server. Devices, such as server devices hosting one or more applications may be periodically rebooted or recycled to maintain optimum performance of the server device. Additionally or alternatively, a fault may cause the server to hang up, which may cause or require a reboot at any given time. However, in conventional arrangements, applications hosted by the rebooted device might not be re-loaded, re-initialized or recompiled until a user or customer request to access the application is received, such as from a user computing device. This may cause delays in proving access or service to the user because the application must re-load, re-initialize and recompile prior to providing the access or service to the user.

Accordingly, as discussed herein, one or more applications or application pools may be defined as always running and may have an auto start property or attribute enabled. A configuration file associated with the server device may be modified to include these properties or attributes and, upon a change in device state (e.g., reboot, or the like), the identified applications may be automatically or autonomously re-loaded, re-initialized and recompiled by, in some examples, loading a dummy payload. Accordingly, when a first request for access is received from the user device, the application may provide a response, access or service within an expected time period or period required by an SLA with no delay to the user.

Figure 4:
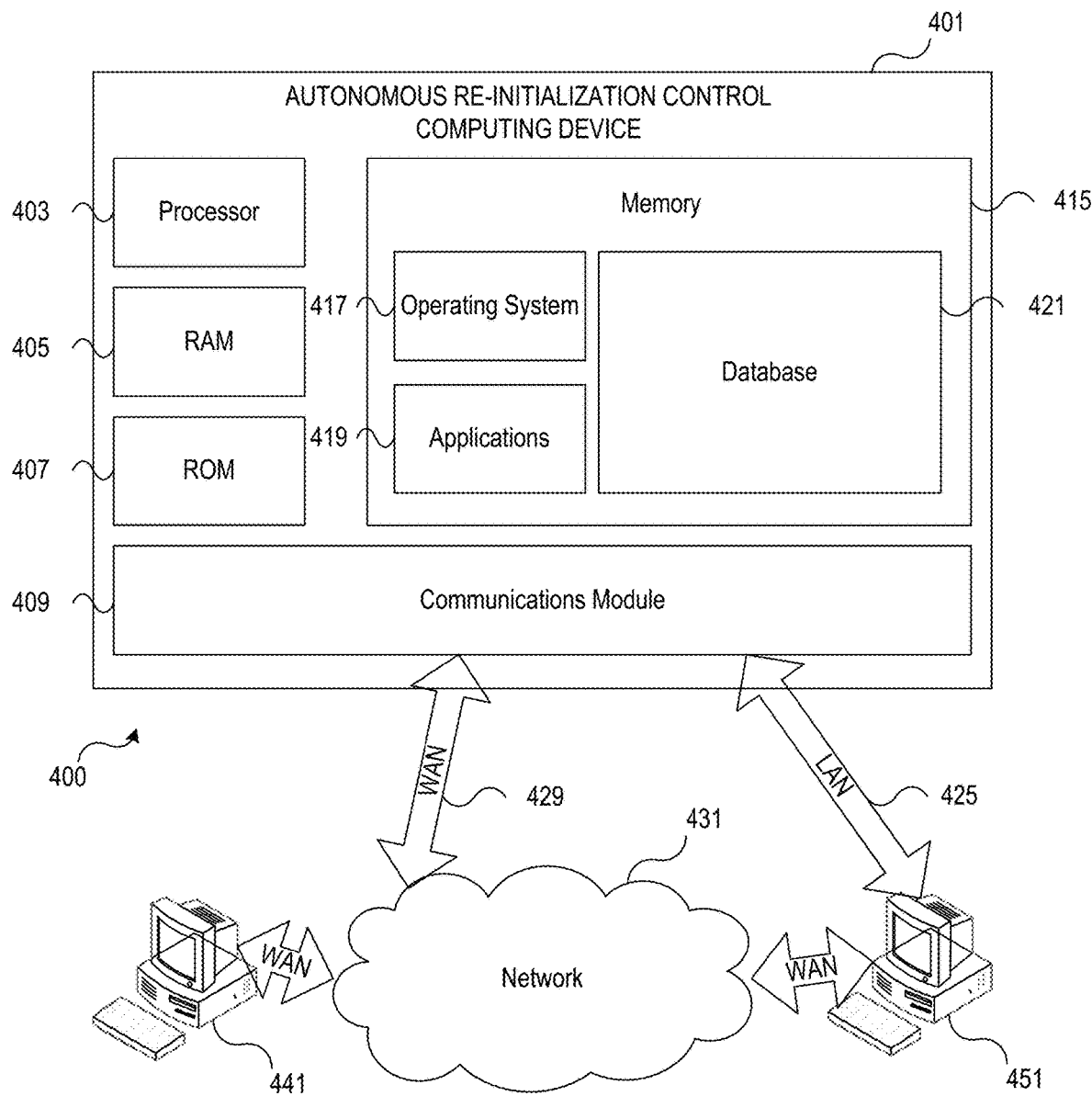
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include autonomous re-initialization control computing device 401 having processor 403 for controlling overall operation of autonomous re-initialization control computing device 401 and its associated components, including Random Access Memory (RAM) 405, Read-Only Memory (ROM) 407, communications module 409, and memory 415. Autonomous re-initialization control computing device 401 may include a variety of computer readable media. Computer readable media may be any available media that may be accessed by autonomous re-initialization control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by autonomous re-initialization control computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on autonomous re-initialization control computing device 401. Such a processor may execute computer-executable instructions stored on a computer-readable medium.

Software may be stored within memory 415 and/or storage to provide instructions to processor 403 for enabling autonomous re-initialization control computing device 401 to perform various functions as discussed herein. For example, memory 415 may store software used by autonomous re-initialization control computing device 401, such as operating system 417, application programs 419, and associated database 421. Also, some or all of the computer executable instructions for autonomous re-initialization control computing device 401 may be embodied in hardware or firmware. Although not shown, RAM 405 may include one or more applications representing the application data stored in RAM 405 while autonomous re-initialization control computing device 401 is on and corresponding software applications (e.g., software tasks) are running on autonomous re-initialization control computing device 401.

Communications module 409 may include a microphone, keypad, touch screen, and/or stylus through which a user of autonomous re-initialization control computing device 401 may provide input, and may also include one or more of a speaker for providing audio output and a video display device for providing textual, audiovisual and/or graphical output. Computing system environment 400 may also include optical scanners (not shown).

Autonomous re-initialization control computing device 401 may operate in a networked environment supporting connections to one or more remote computing devices, such as computing devices 441 and 451. Computing devices 441 and 451 may be personal computing devices or servers that include any or all of the elements described above relative to autonomous re-initialization control computing device 401.

The network connections depicted in FIG. 4 may include Local Area Network (LAN) 425 and Wide Area Network (WAN) 429, as well as other networks. When used in a LAN networking environment, autonomous re-initialization control computing device 401 may be connected to LAN 425 through a network interface or adapter in communications module 409. When used in a WAN networking environment, autonomous re-initialization control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
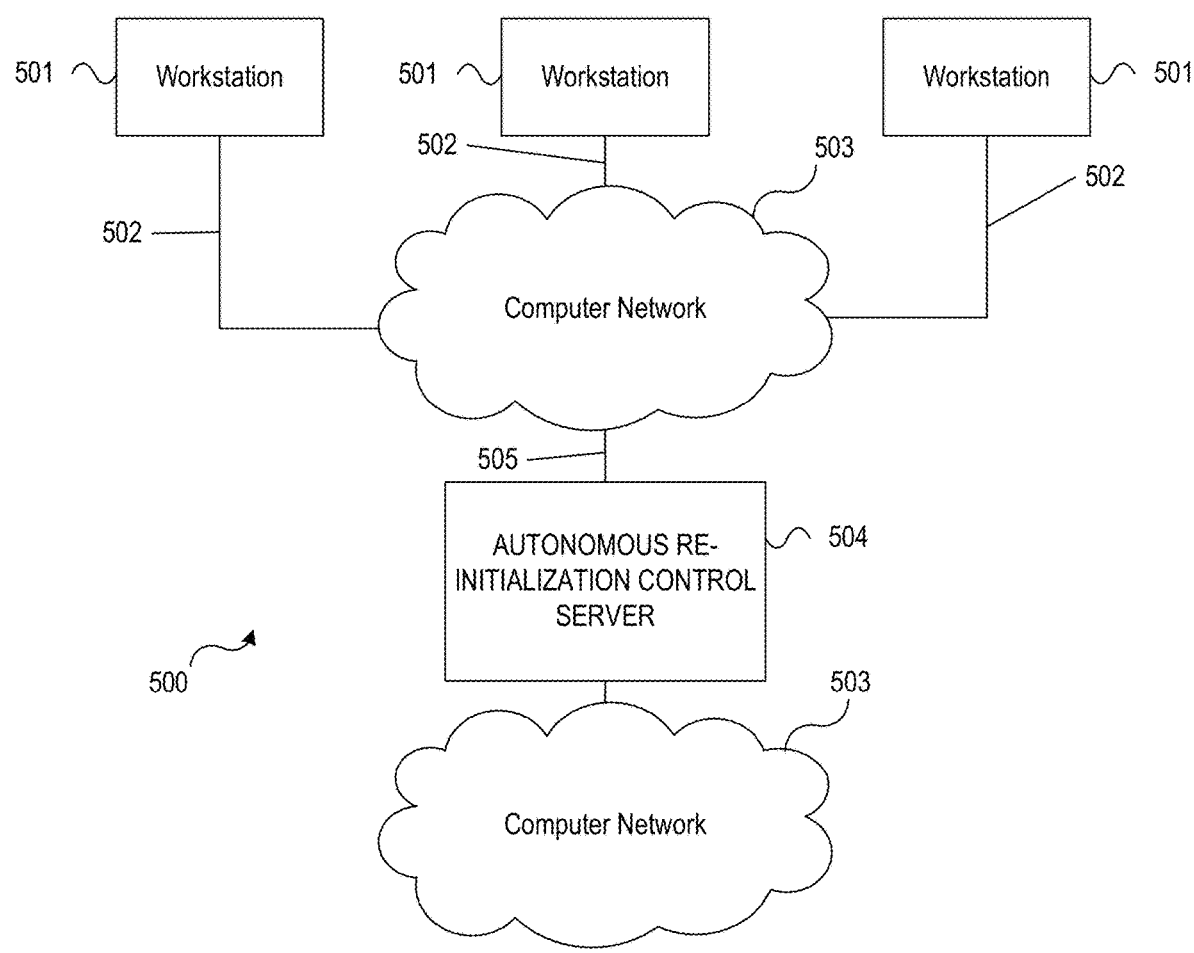
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to autonomous re-initialization control server 504. In system 500, autonomous re-initialization control server 504 may be a server, processor, computer, or data processing device, or combination of the same, configured to perform the functions and/or processes described herein. Server 504 may be used to receive and modify a configuration file, generate a modified configuration file, transmit the modified configuration file, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and autonomous re-initialization control server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
a computing platform including:
at least a first processor;
a first communication interface communicatively coupled to the at least a first processor; and
first memory storing computer-readable instructions that, when executed by the at least a first processor, cause the computing platform to:
receive a configuration file from a support computing device hosting one or more client-facing applications;
execute a first modification of the configuration file to identify and modify at least one client-facing application of the one or more client-facing applications having an always running status;
execute a second modification of the configuration file to identify and modify a custom class enabled for automatic start upon detection of a change of state of the support computing device;
generate a modified configuration file including the first modification and the second modification;
transmit the modified configuration file including the first modification and the second modification to the support computing device;
the support computing device, including:
at least a second processor;
a second communication interface communicatively coupled to the at least a second processor; and
second memory storing computer-readable instructions that, when executed by the at least a second processor, cause the support computing device to:
receive the modified configuration file;
detect a change of state of the support computing device; and
responsive to detecting the change of state, execute the modified configuration file causing the at least one client-facing application to automatically re-load, re-initialize and recompile.

2. The system of claim 1, wherein the at least one client-facing application is automatically re-loaded, re-initialized and recompiled prior to receiving a request to access the at least one client-facing application from a user computing device.

3. The system of claim 1, the computing platform further including instructions that, when executed, cause the computing platform to:
identify at least one application pool including the at least one client-facing application.

4. The system of claim 3, wherein executing the first modification includes identifying all applications in the at least one application pool as having an always running status.

5. The system of claim 3, wherein causing the at least one client-facing application to automatically re-load, re-initialize and recompile including causing all applications in the at least one application pool to automatically re-load, re-initialize and recompile.

6. The system of claim 1, wherein the change of state of the support computing device includes a reboot of the support computing device.

7. The system of claim 6, wherein the reboot occurs on a pre-scheduled basis.

8. A method, comprising:
receiving, by a computing platform having at least a first processor and memory, a configuration file from a support computing device hosting one or more client-facing applications;
executing, by the at least a first processor, a first modification of the configuration file to identify and modify at least one client-facing application of the one or more client-facing applications having an always running status;
executing, by the at least a first processor, a second modification of the configuration file to identify and modify a custom class enabled for automatic start upon detection of a change of state of the support computing device;
generating, by the at least a first processor, a modified configuration file including the first modification and the second modification;
transmitting, by the at least a first processor, the modified configuration file including the first modification and the second modification to the support computing device;
receiving, by the support computing device having at least a second processor and memory, the modified configuration file;
detecting, by the at least a second processor, a change of state of the support computing device; and
responsive to detecting the change of state, executing, by the modified configuration file causing the at least one client-facing application to automatically re-load, re-initialize and recompile.

9. The method of claim 8, wherein the at least one client-facing application is automatically re-loaded, re-initialized and recompiled prior to receiving a request to access the at least one client-facing application from a user computing device.

10. The method of claim 8, further including identifying, by the at least a first processor, at least one application pool including the at least one client-facing application.

11. The method of claim 10, wherein executing the first modification includes identifying all applications in the at least one application pool as having an always running status.

12. The method of claim 10, wherein causing the at least one client-facing application to automatically re-load, re-initialize and recompile including causing all applications in the at least one application pool to automatically re-load, re-initialize and recompile.

13. The method of claim 8, wherein the change of state of the support computing device includes a reboot of the support computing device.

14. The method of claim 13, wherein the reboot occurs on a pre-scheduled basis.

15. One or more non-transitory computer-readable media storing instructions that, when executed by a computing device comprising at least one processor, memory, and a communication interface, cause the computing device to:
   receive a configuration file from a support computing device hosting one or more client-facing applications;
   execute a first modification of the configuration file to identify and modify at least one client-facing application of the one or more client-facing applications having an always running status;
   execute a second modification of the configuration file to identify and modify a custom class enabled for automatic start upon detection of a change of state of the support computing device;
   generate a modified configuration file including the first modification and the second modification; and
   responsive to a change of state of a support computing device detected by the support computing device, execute the modified configuration file causing the at least one client-facing application to automatically re-load, re-initialize and recompile.

16. The one or more non-transitory computer-readable media of claim 15, wherein the at least one client-facing application is automatically re-loaded, re-initialized and recompiled prior to receiving a request to access the at least one client-facing application from a user computing device.

17. The one or more non-transitory computer-readable media of claim 15, further including instructions that, when executed, cause the computing device to:
   identify at least one application pool including the at least one client-facing application.

18. The one or more non-transitory computer-readable media of claim 17, wherein executing the first modification includes identifying all applications in the at least one application pool as having an always running status.

19. The one or more non-transitory computer-readable media of claim 17, wherein causing the at least one client-facing application to automatically re-load, re-initialize and recompile including causing all applications in the at least one application pool to automatically re-load, re-initialize and recompile.

20. The one or more non-transitory computer-readable media of claim 15, wherein the change of state of the support computing device includes a reboot of the support computing device.

21. The one or more non-transitory computer-readable media of claim 20, wherein the reboot occurs on a pre-scheduled basis.

* * * * *